United States Patent Office 2,752,260
Patented June 26, 1956

2,752,260

WATER PROOFING AND STABILISING OF SOIL-CEMENT BRICKS AND MIXTURES

Stanley Wallace Hawkins, Northwich, and Winifred Jane Levy, Sandiway, England, assignors to Imperial Chemical Industries Limited, a corporation of Great Britain No Drawing. Application September 12, 1952,
Serial No. 309,376

Claims priority, application Great Britain
September 14, 1951

10 Claims. (Cl. 106—90)

This invention relates to the waterproofing and stabilisation of compacted soil, which may be water-bonded, and of soil-cement bricks and the like.

In co-pending application Serial No. 200,484, filed December 12, 1950, now Patent 2,687,358, is claimed a process for stabilising water-bonded compacted soil, using a polymethine coloring matter having the general formula $(ArNH.CH:CH.CH:C(OH).CH:NHAr)^+X^-$. Soil containing between 0.05 and 1% by weight of such polymethine coloring matter is also claimed. These stabilized soils have the same mechanical strength and flow properties as the untreated but compacted soils of the same type and water content but are waterproofed, so that a mixture containing the optimum amount of water for firmness retains its properties regardless of rainfall. Stabilised compacted soils can be used for road-making or as sun-dried building bricks in under-developed areas.

We have found that although a small proportion of certain polymethine coloring matters has a substantial waterproofing effect on soil, and a rather higher proportion of cement also has a minor waterproofing effect on soil, the waterproofing effect on these two substances together on soil is far greater than would be predicted from a knowledge of their individual effects.

Recently, a soil-cement brick has also been developed by mixing soil or sand with just sufficient cement, and moistening, compacting and allowing it to set. These sand-cement or soil-cement bricks are much harder than compacted soil, and are an improvement on materials hitherto used for house-building in under-developed regions where stone or fired clay bricks are not available. However, although 8–15% by weight of cement would be sufficient to give the initial strength required, the bricks are too porous to use unless they contain at least 15–20% of cement, and even then their porosity is unattractively high. Soil cement of the same type would often be suitable for road-making except for its permeability which permits percolation of rainwater through the hard layer of soil-cement into the subgrade, and there tends to be softening of the subgrade. We have found that these hardened soil cement or sand-cement compositions can be waterproofed by using certain polymethine coloring matters in the mixture. These soil-cement or sand-cement compositions under stress, e. g. a wet brick or layer, will strain and finally fracture; whereas with water-bonded soil of the optimum water content there is plastic deformation before fracture.

According to the present invention we provide a water-proofed and stabilised compacted mixture of moist soil or sand cement and between 0.05% and 1% by weight of polymethine coloring matters having the general formula $(ArNH.CH:CH.CH:C(OH).CH:NHAr)^+X^-$ where $X^-$ is the anion of a strong acid and Ar is an aryl group of the benzene series free from sulphonic groups.

Thus we may stabilise water-bonded compacted soil by incorporating therein before compaction a small proportion of cement, and between .05 and 1% by weight of polymethine coloring matters having the general formula $(ArNH.CH:CH.CH:C(OH).CH:NHAr)^+X^-$ where $X^-$ is the anion of a strong acid and Ar is an aryl group of the benzene series free from sulphonic groups. The proportion of cement used may be less than 5% and possibly less than 3% of the dry weight of soil, and the cohesion is primarily provided by the clay in the soil. We also provide a mixture containing between 1 and 10 parts by weight of the aforesaid polymethine coloring matter and 100 parts by weight of cement, which may be mixed with up to 3000 or more parts of soil or sand, to be compacted at the optimum water content or to give water-proofed soil-cement bricks and the like.

We may also provide a mixture of soil or sand with sufficient cement to set it, and between 0.05 and 1% by weight of polymethine coloring matters having the general formula $(ArNH.CH:CH.CH:C(OH).CH:NHAr)^+X^-$ where $X^-$ is the anion of a strong acid and Ar is an aryl group of the benzene series free from sulphonic groups. From this mixture we may manufacture hardened compositions such as bricks by compacting the mixture at a suitable water content and allowing the cement to set.

The usual type of hydraulic cement, preferably Portland cement, is used for both the above purposes. The minimum amount of cement needed to produce a useful effect is at least ½% of the weight of water-bonded soil. The maximum amount for this purpose depends on the type of soil used, and varies with the proportions of clay, sand, coarse aggregates and other material therein, and may reach 5%. Larger amounts than this usually cause the soil to set like a soil-cement mixture. A preferred amount is from 1 to 3% of the weight of water-bonded soil according to the nature of the latter.

For the production of soil-cement bricks and the like, the mixture is preferably compacted by compressing it, at about 5–20% moisture content, into a mould. Moulds of between 0.05 and 1 cubic foot are generally used, with the maximum convenient pressure available, such as 50–500 lbs. a square inch. The moisture content of the mixture is preferably chosen so as to be able to get the greatest dry density of the block at the pressure used. The usual type of hydraulic cement, preferably Portland cement, is again used. Although 3% of cement has some hardening effect on compacted soil, it is usually necessary to use at least 5% of cement in the soil-cement or sand-cement mixture to get adequate hardening, but not usually necessary to employ more than 20% by weight of cement in the mixture. Sandy soil requires between 6 and 10% of cement based on the dry weight of soil, silty soil between 8 and 12%, and clay soil between 10 and 14%; peaty and heavy clay soils are generally regarded as useless for this purpose. The preferred mixture contains between 5 and 15% of Portland cement, between 0.1 and 0.5% of hydroxy glutaconic aldehyde dianilhydrochloride, $(C_6H_5NH.CH:CH.CH:C(OH).CH:NHC_6H_5)^+X^-$ between 5 and 20% of water, and the rest soil or sand.

The preferred polymethine coloring matter last referred to (the anion $X^-$ preferably being chloride or other mineral acid ion) is the formula which is generally accepted for the substance made by reacting two moles of aniline with one mole of hydrochloric acid and one mole of furfural, in solution in methyl alcohol. This material is preferred also in the production of water-bonded compacted soils. In both cases the amount of polymethine coloring matter employed depends on the type of soil, the amount of cement, and the degree of waterproofing required. Heavy clay soil requires more than a silty soil, which in turn requires more than a sandy clay soil. For water-bonded soils we can get as good a waterproofing effect on any given soil with 2% of Portland cement and 0.1% of polymethine coloring matter, as we can with 0.25% of the same polymethine coloring matter in the absence of cement, and thus achieve a substantial financial saving. Alternatively, with soils which are not quite sufficiently water-proofed by 0.5% or 1% of polymethine coloring matter, a substantial increase in the degree of waterproofing is effected by adding 3% of Portland cement. In the hardened compositions such as soil-cement bricks the cohesion is chiefly provided by the cement when set, but cohesive strength is provided by the clay and this is protected by waterproofing with the polymethine coloring matter.

In water-bonded compacted soils the optimum water content for cohesion by the clay or other constituents present in the soil depends on the type of soil. With sandy soils the optimum water content is between 5% and 15% and with other soils such as black cotton soil, heavy clay soil, and silty clay soil, the optimum water content is generally between 10% and 20% by weight.

*Example 1*

In this example, the waterproofing effect of cement and polymethine coloring matter in a water-bonded compacted soil is shown by measuring the capillary water absorption of a cylinder of treated compacted water-bonded soil. For comparison, the results of a similar test using cement and polymethine coloring matter separately are shown, and the result with untreated soil. A sandy-clay soil was used in all the tests.

A mixture of 1 part (by weight) of hydroxy glutaconic aldehyde dianil hydrochloride with 20 parts of Portland cement was mixed with 1000 parts of soil and 100 parts of water. A portion of the mixture was compacted in a cylindrical mould 1″ long by 1″ diameter until the compacted cylinder contained 10% by volume of air, removed from the mould, and coated with paraffin wax. It was allowed to set for 3 days. The wax was then stripped off one end and slits were made in the other end to permit egress of air. The cylinder was weighed and stood open end down in water to a depth of 1/10″. After 7 days, the weight of water absorbed was found to be only 0.25 gm. For comparison, with 1 part of hydroxy glutaconic aldehyde dianil hydrochloride only, the same soil absorbed 0.8 gm. of water in 7 days; with 20 parts of Portland cement only, the same soil absorbed 1.8 gm. of water in 7 days; and without either present it absorbed 3.5 gm. in 7 days.

*Example 2*

In this example, the waterproofing effect is shown by measuring the capillary water absorption of a cylinder of waterproofed, hardened soil-cement composition, and comparing it with an untreated soil-cement composition.

A mixture of 380 parts (by weight) of a sandy clay soil with 20 parts of Portland cement and 1 part of hydroxyglutaconic aldehyde dianil hydrochloride, was mixed with 38 parts of water. A portion of the mixture was compacted in a cylindrical mould 1″ long by 1″ diameter until the compacted cylinder contained 10% by volume of air, removed from the mould, and coated with paraffin wax. It was then allowed to set for 3 days. The wax was then stripped off one end and slits were made in the other end to permit egress of air. The cylinder was weighed and stood open end down in water to a depth of 1/10″. After 7 days, the weight of water absorbed was found to be only 0.1 gram.

For comparison, without any hydroxyglutaconic aldehyde dianil hydrochloride present, the same soil-cement mixture absorbed 1.7 grams of water in 7 days.

With higher cement content the brick may remain strong even although water is absorbed (i. e. even if the brick is not waterproofed) and especial advantage is achieved by the present invention in the case of hardened compositions having a lower cement content of say 4% to 8% by weight when an increased strength for a greater period is obtained by waterproofing.

We claim:
1. A waterproofed and stabilised compacted mixture of a material selected from the group consisting of moist soil and sand together with Portland cement containing from 1% to 10% by weight of the latter and between 0.05% and 1% by weight of polymethine coloring matters having the general formula

(ArNH.CH:CH.CH:C(OH).CH:NHAr)+X−

where X− is the anion of a strong acid and Ar is an aryl group of the benzene series free from sulphonic groups.

2. A waterproofed and stabilised compacted mixture as claimed in claim 1 wherein the polymethine coloring matter is hydroxyglutaconic aldehyde dianil hydrochloride.

3. A waterproofed and stabilised water-bonded compacted soil having incorporated therein in admixture from 1% to 5% by weight of Portland cement and between 0.05% and 1% by weight of polymethine coloring matters having the general formula (ArNH.CH:CH.CH:C(OH).CH:NHAr)+X−

where X− is the anion of a strong acid and Ar is an aryl group of the benzene series free from sulphonic groups.

4. A waterproofed and stabilised water-bonded compacted soil as claimed in claim 3 wherein the polymethine coloring matter is hydroxyglutaconic aldehyde dianil hydrochloride.

5. A hardened composition comprising a waterproofed and stabilised compacted mixture of a material selected from the group consisting of soil and sand with sufficient Portland cement to set the mixture in the presence of about 5% to 20% moisture content and with between 0.05% and 1% by weight of polymethine coloring matters having the general formula (ArNH.CH:CH.CH:C(OH).CH:NHAr)+X−

where X− is the anion of a strong acid and Ar is an aryl group of benzene series free from sulphonic groups.

6. A hardened composition as claimed in claim 5 wherein the cement content is from about 4% to about 10% by weight.

7. A hardened composition as claimed in claim 5 wherein the polymethine coloring matter is hydroxyglutaconic aldehyde dianil hydrochloride.

8. A mixture consisting essentially of from 1 to 10 parts by weight of polymethine coloring matters having the general formula (ArNH.CH:CH.CH:C(OH).CH:NHAr)+X−

where X− is the anion of a strong acid and Ar is an aryl group of the benzene series free from sulphonic groups and 100 parts by weight of Portland cement.

9. A waterproofed and stabilized compacted mixture of a material selected from the group consisting of moist soil and sand together with hydraulic cement containing from 1% to 10% by weight of the latter and between 0.05% and 1% by weight of polymethine coloring matters having the general formula:

(ArNH.CH:CH.CH:C(OH).CH:NHAr)+X−
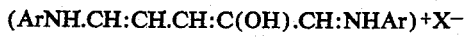

where X− is the anion of a strong acid and Ar is an aryl group of the benzene series free from sulfonic groups.

10. A mixture consisting essentially of from 1 to 10 parts by weight of polymethine coloring matters having the general formula:

(ArNH.CH:CH.CH:C(OH).CH:NHAr)+X−

where X− is the anion of a strong acid and Ar is an aryl group of the benzene series free from sulfonic groups and 100 parts by weight of hydraulic cement.

References Cited in the file of this patent
UNITED STATES PATENTS 2,550,371     Naps et al. _____ Apr. 24, 1951
2,690,975     Scripture _____ Oct. 5, 1954

OTHER REFERENCES

The Washington Post, October 19, 1950, page 3, Soil Treatment Digest.